UNITED STATES PATENT OFFICE.

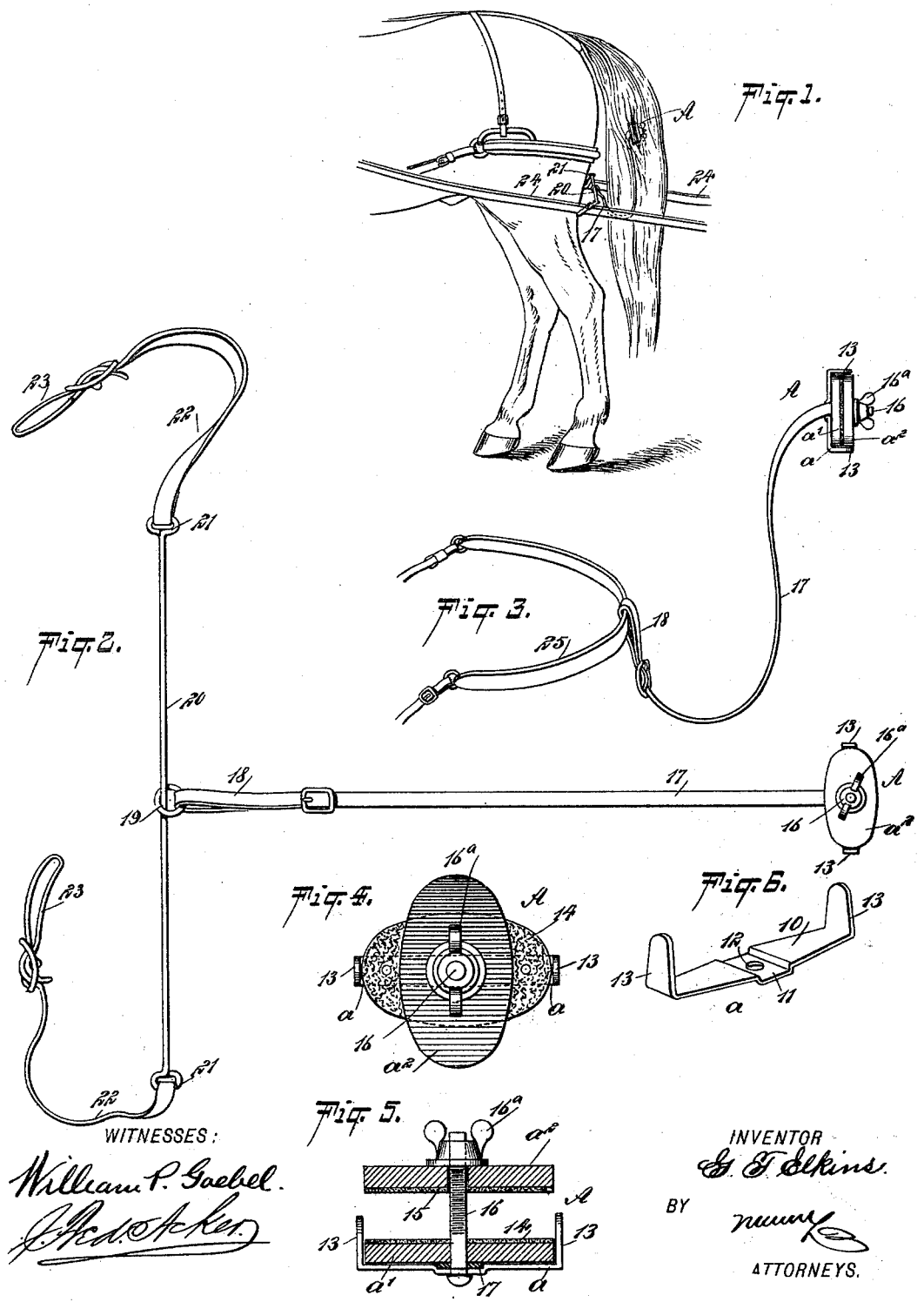

GEORGE THOMAS ELKINS, OF RAUS, TENNESSEE.

TAIL-HOLDER FOR HORSES.

SPECIFICATION forming part of Letters Patent No. 626,600, dated June 6, 1899.

Application filed May 18, 1898. Serial No. 681,077. (No model.)

*To all whom it may concern:*

Be it known that I, GEORGE THOMAS ELKINS, of Raus, in the county of Bedford and State of Tennessee, have invented a new and Improved Tail-Guard for Horses, of which the following is a full, clear, and exact description.

The object of the invention is to provide a simple and readily-applied form of tail-guard which will prevent an animal's tail from becoming entangled with the lines and which will not interfere to any appreciable extent with the lateral movement of the tail.

Another object of the invention is to so construct the tail-guard that it will not be unsightly when applied to the harness, and, further, to provide a device which may be expeditiously and conveniently employed with any form of harness, either single or double.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in all the figures.

Figure 1 represents the rear portion of a horse and the device in position on the animal. Fig. 2 is a plan view of the device detached from the animal and drawn on a larger scale. Fig. 3 is a perspective view of the device applied to the breeching. Fig. 4 is a plan view of the tail-guard clamp in an open position. Fig. 5 is a longitudinal section through the tail-guard clamp, said clamp being in position to clamp the animal's tail; and Fig. 6 is a perspective view of the guide-plate for the guard-clamp of the device.

The tail-guard clamp (shown in detail in Figs. 4 and 5) consists of a guide-plate $a$, a bed-plate $a'$, and a locking-plate $a^2$. The guide-plate, which is shown particularly in Fig. 6, comprises a bottom member 10, provided with a transverse depression 11 in its upper face at its center, and an opening 12 in the central portion of said depression, together with upwardly-extending lugs or arms 13. The bed-plate $a'$ may be made of any suitable material—wood, for example—and may be given any desired shape; but preferably the bed-plate $a'$ is of substantially ovoid contour and is adapted to rest upon the bottom 10 of the guide-plate, the ends of the bed-plate being adjacent to or in engagement with flanges 13 of the said guide-plate, as illustrated in Fig. 5. The bed-plate $a'$ is preferably provided with a flexible or yielding covering 14 upon its upper face. The locking-plate $a^2$ is preferably of corresponding shape to the bed-plate, and its lower face is provided with a covering 15 of a yielding or a pliable material. A bolt 16 is passed through the opening 12 in the guide-plate, through the bed-plate, and loosely through the locking-plate, the upper or outer end of the bolt 16 being provided with a nut $16^a$, usually a thumb-nut. When the nut is loosened, the locking-plate may be readily turned upon the bolt 16, so as to carry the said plate parallel with the bed-plate, as shown in Fig. 5, or at an angle thereto, as shown in Fig. 4, and the locking-plate may be made to clamp any object that may be placed between it and the bed-plate by screwing down the nut $16^a$.

A strap 17 is secured to the guide-clamp, one end of the strap being fitted in the depression 11 in the guide-plate, and the bolt 16 of the guard-clamp passes through the said strap, as illustrated in Fig. 5. The other end of the strap is provided with a loop 18, which may be formed through the medium of a buckle or otherwise. When the device is to be applied to the breeching 25 of the harness, the breeching-strap is passed through the loop 18, as shown in Fig. 3, and when the device is to be attached to the traces 24 of a harness, as shown in Fig. 1, the loop 18 of the strap 17 is provided with a ring 19, through which a bar 20 is loosely passed, terminating in an eye 21 at each of its ends, and a strap 22 is connected with the bar 20 at each of its eyes, the straps 22 being provided with loops 23, formed through the medium of buckles or otherwise, the said loops being adapted to receive the aforesaid traces.

The hair at the stump or lower end of the tail of the animal is placed between the bed and the locking plates of the guard-clamp, as shown in Fig. 1, and the hair of the tail is made to pass over and around the guard-clamp, so as to conceal it, the strap 17, connected with the guard-clamp, being of sufficient length to permit proper freedom of the tail, yet the said strap serves to prevent the tail from being elevated to such a degree that it will interfere with the driving-lines.

It will be understood that wherever a loop is shown a snap-hook or its equivalent may be employed.

Having thus described my invention, I claim as new and desire to secure by Letters Patent—

In a tail-guard for horses, the combination of a clamp consisting in a guide-plate, a bed-plate and in a locking-plate the guide-plate having upwardly-extending arms at its ends between which the bed and locking plates are located, a bolt passing through the plates of the clamp to hold them together and a strap held by the bolt between the guide and bed plates, and adapted to be fastened to the harness.

GEORGE THOMAS ELKINS.

Witnesses:
J. M. SHOFNER,
J. D. HUTTON.